(12) United States Patent
Nedorezov et al.

(10) Patent No.: US 9,791,040 B2
(45) Date of Patent: Oct. 17, 2017

(54) METHODS AND SYSTEM FOR OPERATING A VEHICLE TRANSMISSION

(71) Applicant: Ford Global Technologies, LLC, Dearborn, MI (US)

(72) Inventors: Felix Nedorezov, Rochester Hills, MI (US); Alexander O'Connor Gibson, Ann Arbor, MI (US); Hong Jiang, Birmingham, MI (US); Daniel Colvin, Farmington Hills, MI (US); Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/621,033

(22) Filed: Feb. 12, 2015

(65) Prior Publication Data

US 2016/0238127 A1 Aug. 18, 2016

(51) Int. Cl.

| | |
|---|---|
| *G05D 1/00* | (2006.01) |
| *F16H 61/02* | (2006.01) |
| *F16H 61/00* | (2006.01) |
| *B60K 6/387* | (2007.10) |
| *B60K 6/547* | (2007.10) |
| *B60W 10/02* | (2006.01) |
| *B60W 10/06* | (2006.01) |
| *B60W 10/08* | (2006.01) |
| *B60W 10/115* | (2012.01) |

(Continued)

(52) U.S. Cl.
CPC ......... *F16H 61/0251* (2013.01); *B60K 6/387* (2013.01); *B60K 6/547* (2013.01); *B60W 10/02* (2013.01); *B60W 10/06* (2013.01); *B60W 10/08* (2013.01); *B60W 10/115* (2013.01); *B60W 10/30* (2013.01); *B60W 20/30* (2013.01); *B60W 20/40* (2013.01); *B60W 30/19* (2013.01); *F16H 61/0031* (2013.01); *F16H 61/0262* (2013.01); *B60K 2006/4825* (2013.01); *B60W 2710/1083* (2013.01); *Y02T 10/6252* (2013.01); *Y02T 10/6286* (2013.01); *Y10S 903/914* (2013.01); *Y10S 903/946* (2013.01)

(58) Field of Classification Search
CPC ........ B60W 2510/00; B60W 2720/00; B60W 2720/20; B60W 2720/40; B60W 2720/263; B60W 2720/266; B60W 2720/26; F16H 15/00; F16H 21/00; F16H 37/0853; F16H 37/0846; F16H 2714/00; F16H 2716/00; F16H 2720/00
USPC .......................................... 701/22
See application file for complete search history.

(56) References Cited

U.S. PATENT DOCUMENTS

| | | |
|---|---|---|
| 8,702,564 B2 | 4/2014 | Moorman et al. |
| 2012/0083388 A1* | 4/2012 | Watanabe ............... F16H 61/16 477/39 |

(Continued)

FOREIGN PATENT DOCUMENTS

EP 2168803 A2 3/2010

*Primary Examiner* — Muhammad Shafi
(74) *Attorney, Agent, or Firm* — David Kelley; McCoy Russell LLP (57) ABSTRACT

Systems and methods for operating a transmission of a hybrid vehicle's driveline are presented. In one example, the systems and methods adjust operation of an electrically driven transmission pump that supplies transmission fluid to one or more transmission components in response to a rotational stopping position of a mechanically drive transmission pump.

19 Claims, 4 Drawing Sheets

(51) Int. Cl.
   *B60W 10/30*   (2006.01)
   *B60W 30/19*   (2012.01)
   *B60W 20/30*   (2016.01)
   *B60W 20/40*   (2016.01)
   B60K 6/48       (2007.10)

(56) References Cited

U.S. PATENT DOCUMENTS

| | | | |
|---|---|---|---|
| 2013/0030624 A1 | 1/2013 | Suvama et al. | |
| 2013/0296119 A1* | 11/2013 | Reed | B60W 10/02 477/5 |
| 2013/0296125 A1* | 11/2013 | Gibson | B60W 20/10 477/5 |
| 2013/0297122 A1* | 11/2013 | Gibson | B60W 20/40 701/22 |
| 2014/0356212 A1* | 12/2014 | Barth | F04B 49/06 418/164 |

* cited by examiner

METHODS AND SYSTEM FOR OPERATING A VEHICLE TRANSMISSION

FIELD

The present description relates to methods and a system for operating a transmission of a vehicle. The methods and systems may be particularly useful for hybrid vehicles that include an electric pump for supplying fluid to transmission components.

BACKGROUND AND SUMMARY

A driveline of a hybrid vehicle may include an internal combustion engine, an electric motor, and a transmission to propel the vehicle. The hybrid vehicle may stop engine and motor rotation during some conditions to conserve electrical and chemical energy. For example, engine and motor rotation may be stopped when the vehicle stops to reduce fuel consumption and electrical charge consumption. However, it may be desirable to hold the driveline in a condition that helps to hold the vehicle stationary after the vehicle is stopped. For example, it may be desirable to couple the transmission output shaft to the transmission case and vehicle chassis to reduce the possibility of vehicle motion. The transmission output shaft may be coupled to the transmission case via one or more applied transmission clutches. Thus, it may be desirable to keep one or more transmission clutches applied during a vehicle stop. One way to keep transmission clutches applied when the engine and motor are not rotating is to supply transmission fluid to transmission clutches via an electric pump. The electric pump is operated at a higher speed to maintain transmission fluid line pressure, but the electric pump may consume more electrical energy than is desired.

The inventors herein have recognized the above-mentioned issues and have developed a driveline operating method, comprising: adjusting a speed of an electric transmission pump via a controller in response to a rotational stop position of a mechanically driven transmission pump.

By adjusting speed of an electric transmission fluid pump in response to a rotational stopping position of a mechanically driven transmission fluid pump, it may be possible to provide the technical result of reducing energy consumed by the electric transmission fluid pump while providing sufficient output pressure to maintain operating states of transmission clutches. For example, speed of the electric transmission fluid pump may be adjusted to a speed that is sufficient to overcome internal leakage of fluid within the transmission and maintain clutch operating state while not operating at too high of a speed to excessively consume electrical power.

The present description may provide several advantages. In particular, the approach may provide improved vehicle energy efficiency. Further, the approach may provide desired transmission functionality when the transmission torque converter is not rotating. Additionally, the approach may be applied to find energy efficient rotational stopping positions for the mechanical transmission pump.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
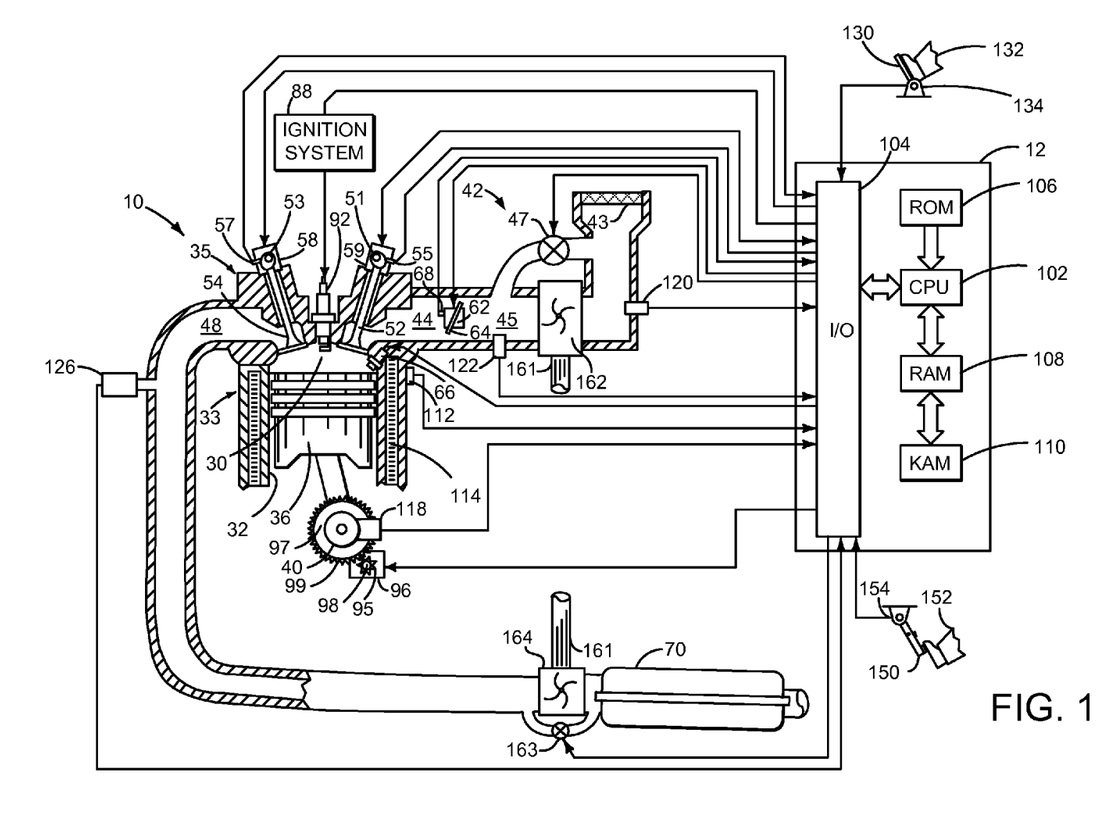
FIG. 1 is a schematic diagram of an engine.
Figure 2:
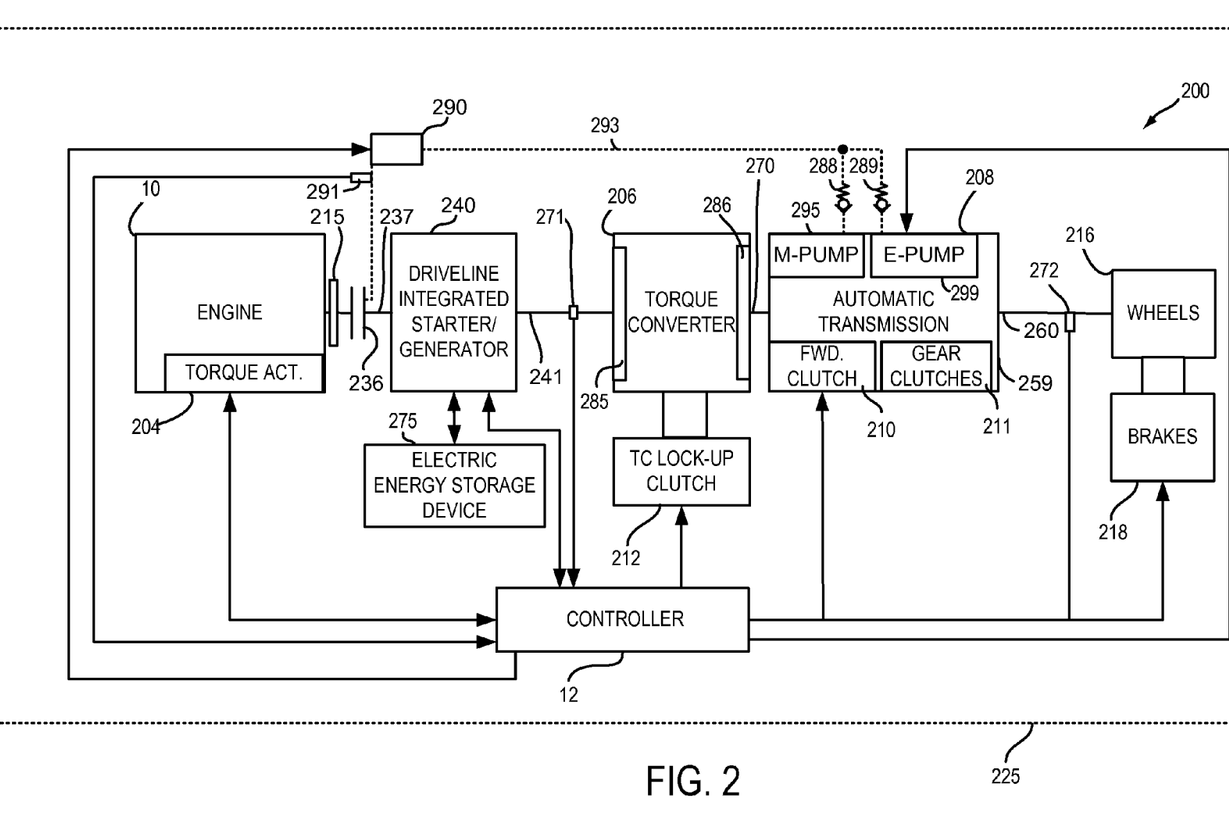
FIG. 2 is a schematic diagram of a hybrid vehicle driveline.
Figure 3:
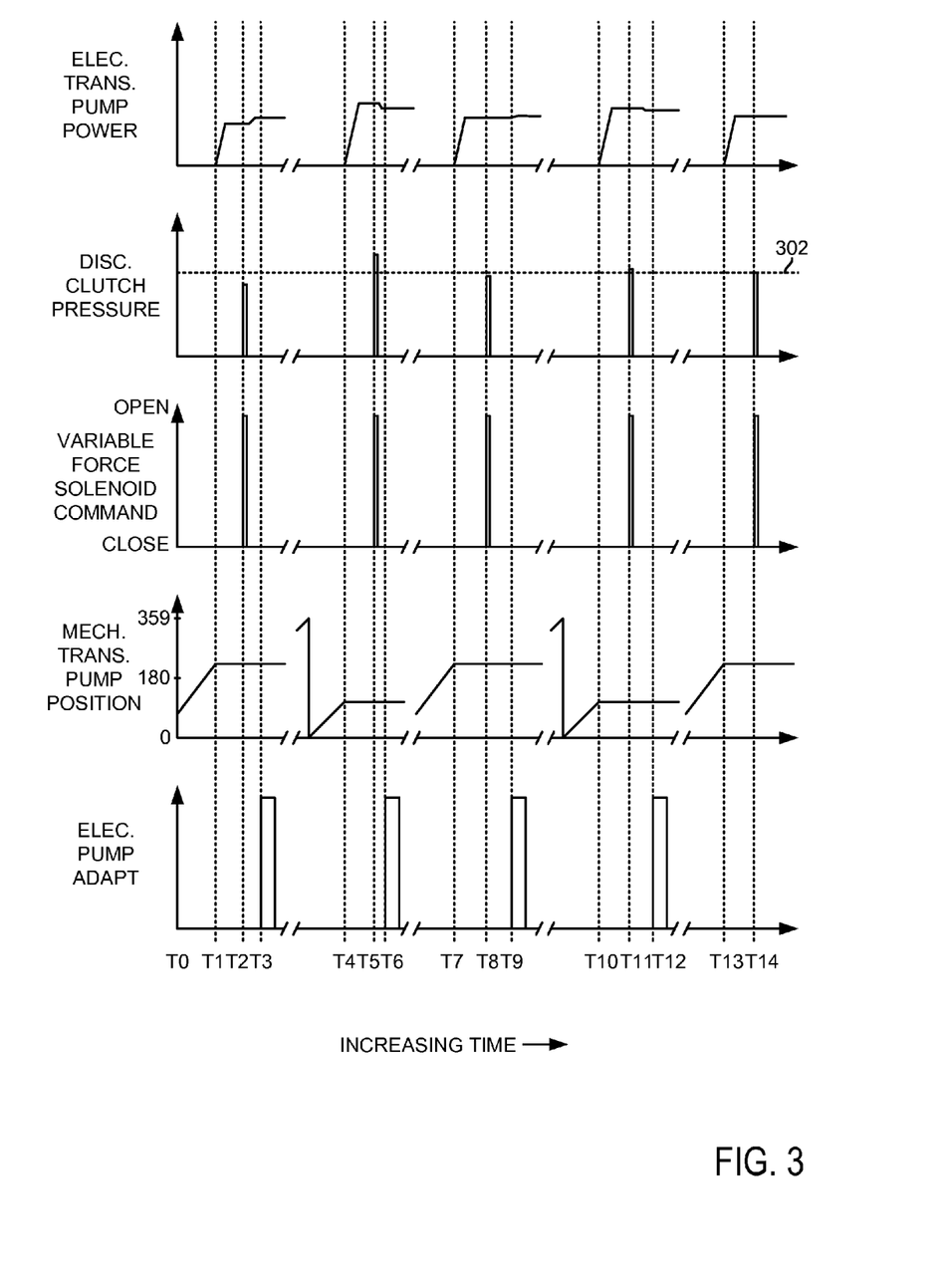
FIG. 3 is an operating sequence for the hybrid driveline.

The present description is related to controlling a driveline of a hybrid vehicle during vehicle stopping. The hybrid vehicle may include an engine as is shown in FIG. 1. The engine of FIG. 1 may be included in a powertrain or driveline as is shown in FIG. 2. The driveline may be operated according to the sequence of FIG. 3. The method of FIG. 4 may be the basis for operating the driveline as is shown in FIG. 3.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42.

In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. Hydraulic conduits or lines are shown by dotted lines. Electrical and mechanical connections are shown via solid lines.

The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. In this example, disconnect clutch 236 may be operated via fluid supplied from mechanically driven transmission fluid pump 295 or electrically driven transmission fluid pump 299. Mechanically driven transmission fluid pump 295 may be driven via torque converter impeller 285 or input shaft 241. Check valves 288 and 289 allow fluid to flow from mechanically driven transmission fluid pump 295 and electrically driven transmission fluid pump 299 to variable force solenoid 290 via conduit 293. Check valves 288 and 289 also prevent fluid backflow to mechanically driven transmission fluid pump 295 and electrically driven transmission fluid pump 299. Pressure of fluid supplied to driveline disconnect clutch 236 is monitored by controller 12 via pressure sensor 291. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208.

Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives DISG position via position sensor 271 which also indicates the position of shaft 241 and mechanically driven transmission fluid pump 295. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides for a system, comprising: an engine; a motor; a disconnect clutch positioned in a driveline between the engine and the motor; a transmission coupled to the motor, the transmission including an electrically driven pump and a mechanically driven pump; and a controller including executable instructions stored in non-transitory memory for adapting a predetermined speed of the electrically driven pump in response to a position the mechanically driven pump stops rotating. The system includes where adapting the predetermined speed includes revising a value stored in memory. The system further comprises additional instructions to command the disconnect clutch open and determine a pressure output of the electrically driven pump when the disconnect clutch is commanded open. The system further comprises additional instructions to adjust a position of the mechanical pump in response to power consumed via the electrically driven pump. The system further comprises additional instructions to adapt the predetermined speed of the electrically driven pump after output pressure of the electrically driven pump is substantially constant.

Referring now to FIG. 3, a driveline operating sequence is shown. The driveline operating sequence of FIG. 2 may be provided via the system of FIGS. 1 and 2. The driveline operating sequence may also be provided based on the method of FIG. 4. The double slashes (e.g., / /) indicated along the horizontal plot axis represent time discontinuities. The amount of time between the double slashes may vary and the driveline may propel the vehicle during the time represented by the double slashes.

The first plot from the top of FIG. 3 is a plot of electrically driven transmission fluid pump electrical power versus time. The vertical axis represents electrically driven transmission fluid pump electrical power and electrically driven transmission fluid pump electrical power increases in the direction of the vertical axis arrow. The horizontal axis represents time and time increases from the left side of the plot to the right side of the plot.

The second plot from the top of FIG. 3 is a plot of pressure of fluid supplied to the driveline disconnect clutch versus time. The driveline disconnect clutch pressure is equivalent to transmission line pressure or transmission pump outlet pressure when the variable force solenoid is commanded open. The vertical axis represents pressure of fluid supplied to the driveline disconnect clutch and pressure supplied to the driveline disconnect clutch increases in the direction of the vertical axis arrow. The horizontal axis represents time and time increases from the left side of the plot to the right side of the plot. Horizontal line 302 represents a threshold pressure desirable for holding operating states of transmission components (e.g., clutches). In some examples, horizontal line 302 may represent a threshold pressure for activating transmission components.

The third plot from the top of FIG. 3 is a plot of variable force solenoid command versus time. The vertical axis represents variable force solenoid command and the variable force solenoid is being commanded open when the trace is at a higher level. The variable force solenoid is being commanded closed when the trace is at a lower level. The variable force solenoid enables fluid flow to the driveline disconnect clutch when commanded open. The horizontal axis represents time and time increases from the left side of the plot to the right side of the plot.

The fourth plot from the top of FIG. 3 is a plot of mechanically driven transmission fluid pump rotational position versus time. The vertical axis represents mechanically driven transmission fluid pump rotational position in degrees. The mechanically driven transmission fluid pump rotational position ranges from 0 to 359 degrees for 360 degrees of rotation. The horizontal axis represents time and time increases from the left side of the plot to the right side of the plot.

The fifth plot from the top of FIG. 3 is a plot of electrically driven transmission fluid pump adaptation state versus time. The vertical axis represents electrically driven transmission fluid pump adaptation state and electrically driven transmission fluid pump control parameters are adjusted or adapted when the electrically driven transmission fluid pump adaptation state trace is at a higher level. The electrically driven transmission fluid pump control parameters are not adjusted or adapted when the trace is at a lower level. The horizontal axis represents time and time increases from the left side of the plot to the right side of the plot.

At time T0, the driveline integrated starter/generator (not shown) is decelerating toward zero speed. The DISG may decelerate to zero speed when the vehicle in which the DISG operates is decelerating to zero speed. Alternatively, the DISG speed may go to zero when driver demand torque is low while the vehicle continues to move. The electrically driven transmission fluid pump power is zero indicating that the electrically driven pump is not operating. The electrically driven pump may be commanded off when the DISG and/or engine are rotating the mechanically driven transmission fluid pump at a speed greater than a threshold speed. The mechanically driven transmission fluid pump supplies fluid to transmission components at a threshold pressure. The threshold pressure operates or holds operating states of transmission components. The driveline disconnect clutch pressure is low indicating that the driveline disconnect clutch is open. The variable force solenoid command is at a lower level indicating that fluid is not being supplied to open the driveline disconnect clutch. The mechanical transmission fluid pump position is increasing and the electrically driven transmission fluid pump control parameters are not being adapted because the electrically driven transmission fluid pump trace is at a lower level.

At time T1, mechanically driven transmission fluid pump rotation stops at a position of about 210 degrees. The electrically driven transmission fluid pump is activated to maintain transmission fluid pressure to transmission components (e.g., clutches). The electrically driven transmission fluid pump power increases when the electrically driven transmission fluid pump is activated. The driveline disconnect clutch pressure and variable force solenoid command remain unchanged and at lower levels. The electrically driven transmission fluid pump control parameters are not being adapted.

At time T2, the variable force solenoid is commanded open for a duration shorter than a time it takes to close the driveline disconnect clutch. By opening the variable force solenoid, transmission fluid pressure may be determined at a location downstream of the variable force solenoid in the direction of fluid flow to the driveline disconnect clutch. Transmission fluid pressure increases at the disconnect clutch to show transmission line pressure or pump outlet pressure, but the pressure is less than level 302. The mechanically driven transmission pump is not being driven so the disconnect clutch pressure reflects the electrically driven transmission fluid pump outlet pressure. The electrically driven transmission fluid pump power is at a value stored in memory that is based on supplying fluid at pressure indicated by horizontal line 302. Thus, the electric power supplied to the electrically driven transmission fluid pump is not sufficient to provide fluid pressure at threshold 302. The electrically driven transmission fluid pump control parameters are not being adapted or adjusted.

Between time T2 and time T3, the electrical power supplied to the electrically driven transmission fluid pump is increased to increase the transmission line pressure to level 302. The increase may be based on a difference between level 302 and the pressure output by the electrically driven transmission fluid pump. The variable force solenoid is commanded off so that the driveline disconnect clutch is not closed. The disconnect clutch pressure is reduced in response to the variable force solenoid being commanded off.

At time T3, adaptation or adjustment of electrically driven transmission fluid pump control parameters occurs. In particular, the desired electrically driven transmission fluid pump speed value stored in memory is increased and restored to memory. The electrically driven transmission fluid pump power remains activated and the disconnect clutch pressure remains at a lower value. The mechanically driven transmission fluid pump position remains unchanged and electric transmission fluid pump power continues at a same power. The sequence ends at the double slash marks shortly after time T3.

At the right side of the double slashes between time T3 and time T4, the second driveline rotational stop occurs. The driveline integrated starter/generator (not shown) is decelerating toward zero speed. The electrically driven transmission fluid pump power is zero indicating that the electrically driven pump is not operating. The electrically driven pump may be commanded off when the DISG and/or engine are rotating the mechanically driven transmission fluid pump at a speed greater than a threshold speed. The mechanically driven transmission fluid pump supplies fluid to transmission components at a threshold pressure. The threshold pressure operates or holds operating states of transmission components. The driveline disconnect clutch pressure is low indicating that the driveline disconnect clutch is open. The variable force solenoid command is at a lower level indicating that fluid is not being supplied to open the driveline disconnect clutch. The mechanical transmission fluid pump position decreases from 359 to zero and then increases. The electrically driven transmission fluid pump control parameters are not being adapted since the electrically driven transmission fluid pump trace is at a lower level.

At time T4, mechanically driven transmission fluid pump rotation stops at a position of about 120 degrees. The electrically driven transmission fluid pump is activated to maintain transmission fluid pressure to transmission components (e.g., clutches). The electrically driven transmission fluid pump power increases when the electrically driven transmission fluid pump is activated. The electrically driven transmission fluid pump power is a different power level than is output to the electrically driven transmission fluid pump at time T1. The driveline disconnect clutch pressure and variable force solenoid command remain unchanged and at lower levels. The electrically driven transmission fluid pump control parameters are not being adapted.

At time T5, the variable force solenoid is commanded open for a duration shorter than a time it takes to close the driveline disconnect clutch. By opening the variable force solenoid, transmission fluid pressure may be determined at a location downstream of the variable force solenoid in the direction of fluid flow to the driveline disconnect clutch. Transmission fluid pressure increases at the disconnect clutch to show transmission line pressure or pump outlet pressure, but the pressure is greater than level 302. The mechanically driven transmission pump is not being driven so the disconnect clutch pressure reflects the electrically driven transmission fluid pump outlet pressure. The electrically driven transmission fluid pump power is at a value stored in memory that is based on supplying fluid at pressure indicated by horizontal line 302. Thus, the electric power supplied to the electrically driven transmission fluid pump is more than sufficient to provide fluid pressure at threshold 302. Consequently, electrical power consumption is greater than is desired. The electrically driven transmission fluid pump control parameters are not being adapted or adjusted.

Between time T5 and time T6, the electrical power supplied to the electrically driven transmission fluid pump is decreased to decrease the transmission line pressure to level 302. The decrease may be based on a difference between level 302 and the pressure output by the electrically driven transmission fluid pump. The variable force solenoid is commanded off so that the driveline disconnect clutch is not closed. The disconnect clutch pressure is reduced in response to the variable force solenoid being commanded off.

At time T6, adaptation or adjustment of electrically driven transmission fluid pump control parameters occurs. The desired electrically driven transmission fluid pump speed value stored in memory is decreased and restored to memory. The electrically driven transmission fluid pump power remains activated and the disconnect clutch pressure remains at a lower value. The mechanically driven transmission fluid pump position remains unchanged and electric transmission fluid pump power continues at a same power. The sequence ends at the double slash marks shortly after time T6.

At the right side of the double slashes between time T6 and time T7, the driveline integrated starter/generator (not shown) is decelerating toward zero speed. The electrically driven transmission fluid pump power is zero indicating that the electrically driven pump is not operating. The electrically driven pump may be commanded off when the DISG and/or engine are rotating the mechanically driven transmission fluid pump at a speed greater than a threshold speed. The mechanically driven transmission fluid pump supplies fluid to transmission components at a threshold pressure. The threshold pressure operates or holds operating states of transmission components. The driveline disconnect clutch pressure is low indicating that the driveline disconnect clutch is open. The variable force solenoid command is at a lower level indicating that fluid is not being supplied to open the driveline disconnect clutch. The mechanical transmission fluid pump position increases to 210 degrees. The electrically driven transmission fluid pump control parameters are not being adapted since the electrically driven transmission fluid pump trace is at a lower level.

At time T7, the third driveline rotational stop occurs. The third driveline rotational stop occurs at the same position as the first rotational stop (e.g., time T1) or at about 210 degrees. Specifically, the mechanically driven transmission fluid pump rotation stops at a position of about 210 degrees. The electrically driven transmission fluid pump is activated to maintain transmission fluid pressure to transmission components (e.g., clutches). The electrically driven transmission fluid pump power increases when the electrically driven transmission fluid pump is activated. The electrically driven transmission fluid pump power is a different power level than is output to the electrically driven transmission fluid pump at time T1 since the value for the mechanically driven transmission fluid pump stopping at 210 degrees was revised at time T3. The driveline disconnect clutch pressure and variable force solenoid command remain unchanged and at lower levels. The electrically driven transmission fluid pump control parameters are not being adapted.

At time T8, the variable force solenoid is commanded open for a duration shorter than a time it takes to close the driveline disconnect clutch. By opening the variable force solenoid, transmission fluid pressure may be determined at a location downstream of the variable force solenoid in the direction of fluid flow to the driveline disconnect clutch. Transmission fluid pressure increases at the disconnect clutch to show transmission line pressure or pump outlet pressure, but the pressure is still less than level 302. The mechanically driven transmission pump is not being driven so the disconnect clutch pressure reflects the electrically driven transmission fluid pump outlet pressure. The electrically driven transmission fluid pump power is at a value stored in memory that is based on supplying fluid at pressure indicated by horizontal line 302. Thus, the electric power supplied to the electrically driven transmission fluid pump is still less than sufficient to provide fluid pressure at threshold 302. Consequently, electrical power consumption is less than is desired. The electrically driven transmission fluid pump control parameters are not being adapted or adjusted at time T8.

Between time T8 and time T9, the electrical power supplied to the electrically driven transmission fluid pump is increased to increase the transmission line pressure to level 302. The increase may be based on a difference between level 302 and the pressure output by the electrically driven transmission fluid pump. The variable force solenoid is commanded off so that the driveline disconnect clutch is not closed. The disconnect clutch pressure is increased in response to the variable force solenoid being commanded off.

At time T9, adaptation or adjustment of electrically driven transmission fluid pump control parameters occurs. The desired electrically driven transmission fluid pump speed value stored in memory is increased and restored to memory. The electrically driven transmission fluid pump power remains activated and the disconnect clutch pressure remains at a lower value. The mechanically driven transmission fluid pump position remains unchanged and electric transmission fluid pump power continues at a same power. The sequence ends at the double slash marks shortly after time T9.

At the right side of the double slashes between time T9 and time T10, the driveline integrated starter/generator (not shown) is decelerating toward zero speed. The electrically driven transmission fluid pump power is zero indicating that the electrically driven pump is not operating. The electrically driven pump may be commanded off when the DISG and/or engine are rotating the mechanically driven transmission fluid pump at a speed greater than a threshold speed. The mechanically driven transmission fluid pump supplies fluid to transmission components at a threshold pressure. The threshold pressure operates or holds operating states of transmission components. The driveline disconnect clutch pressure is low indicating that the driveline disconnect clutch is open. The variable force solenoid command is at a lower level indicating that fluid is not being supplied to open the driveline disconnect clutch. The mechanical transmission fluid pump position decreases from 359 to zero and then increases. The electrically driven transmission fluid pump control parameters are not being adapted since the electrically driven transmission fluid pump trace is at a lower level.

At time T10, the fourth driveline rotational stop occurs. The fourth driveline rotational stop occurs at the same position as the first rotational stop (e.g., time T4) or at about 120 degrees. In particular, the mechanically driven transmission fluid pump rotation stops at a position of about 120 degrees. The electrically driven transmission fluid pump is activated to maintain transmission fluid pressure to transmission components (e.g., clutches). The electrically driven transmission fluid pump power increases when the electrically driven transmission fluid pump is activated. The electrically driven transmission fluid pump power is a different power level than is output to the electrically driven transmission fluid pump at time T1 since the value for the mechanically driven transmission fluid pump stopping at 120 degrees was revised at time T3. The driveline disconnect clutch pressure and variable force solenoid command remain unchanged and at lower levels. The electrically driven transmission fluid pump control parameters are not being adapted.

At time T11, the variable force solenoid is commanded open for a duration shorter than a time it takes to close the driveline disconnect clutch. By opening the variable force solenoid, transmission fluid pressure may be determined at a location downstream of the variable force solenoid in the direction of fluid flow to the driveline disconnect clutch. Transmission fluid pressure increases at the disconnect clutch to show transmission line pressure or pump outlet pressure, but the pressure is still greater than level 302. The mechanically driven transmission pump is not being driven so the disconnect clutch pressure reflects the electrically driven transmission fluid pump outlet pressure. The electrically driven transmission fluid pump power is at a value stored in memory that is based on supplying fluid at pressure indicated by horizontal line 302. Thus, the electric power supplied to the electrically driven transmission fluid pump is still greater than is necessary to provide fluid pressure at threshold 302. Consequently, electrical power consumption is more than is desired. The electrically driven transmission fluid pump control parameters are not being adapted or adjusted at time T11.

Between time T11 and time T12, the electrical power supplied to the electrically driven transmission fluid pump is decreased to decrease the transmission line pressure to level 302. The decrease may be based on a difference between level 302 and the pressure output by the electrically driven transmission fluid pump. The variable force solenoid is commanded off so that the driveline disconnect clutch is not closed. The disconnect clutch pressure is increased in response to the variable force solenoid being commanded off.

At time T12, adaptation or adjustment of electrically driven transmission fluid pump control parameters occurs. The desired electrically driven transmission fluid pump speed value stored in memory is decreased and restored to memory. Decreasing the electrically driven pump speed reduced electrical power consumption. The electrically driven transmission fluid pump power remains activated and the disconnect clutch pressure remains at a lower value. The mechanically driven transmission fluid pump position remains unchanged and electric transmission fluid pump power continues at a same power. The sequence ends at the double slash marks shortly after time T12.

At the right side of the double slashes between time T12 and time T13, the driveline integrated starter/generator (not shown) is decelerating toward zero speed. The electrically driven transmission fluid pump power is zero indicating that the electrically driven pump is not operating. The electrically driven pump may be commanded off when the DISG and/or engine are rotating the mechanically driven transmission fluid pump at a speed greater than a threshold speed. The mechanically driven transmission fluid pump supplies fluid to transmission components at a threshold pressure. The threshold pressure operates or holds operating states of transmission components. The driveline disconnect clutch pressure is low indicating that the driveline disconnect clutch is open. The variable force solenoid command is at a lower level indicating that fluid is not being supplied to open the driveline disconnect clutch. The mechanical transmission fluid pump position increases to 210 degrees. The electrically driven transmission fluid pump control parameters are not being adapted since the electrically driven transmission fluid pump trace is at a lower level.

At time T13, the fifth driveline rotational stop occurs. The fifth driveline rotational stop occurs at the same position as the first rotational stop (e.g., time T1) or at about 210 degrees. The electrically driven transmission fluid pump is activated to maintain transmission fluid pressure to transmission components (e.g., clutches). The electrically driven transmission fluid pump power increases when the electrically driven transmission fluid pump is activated. The electrically driven transmission fluid pump power is a different power level than is output to the electrically driven transmission fluid pump at time T7 since the value for the mechanically driven transmission fluid pump stopping at 210 degrees was revised at time T9. The driveline disconnect clutch pressure and variable force solenoid command remain unchanged and at lower levels. The electrically driven transmission fluid pump control parameters are not being adapted.

At time T14, the variable force solenoid is commanded open for a duration shorter than a time it takes to close the driveline disconnect clutch. By opening the variable force solenoid, transmission fluid pressure may be determined at a location downstream of the variable force solenoid in the direction of fluid flow to the driveline disconnect clutch. Transmission fluid pressure increases at the disconnect clutch to show transmission line pressure or pump outlet pressure, and the pressure is at the level 302. The mechanically driven transmission pump is not being driven so the disconnect clutch pressure reflects the electrically driven transmission fluid pump outlet pressure. The electrically driven transmission fluid pump power is at a value stored in memory that is based on supplying fluid at pressure indicated by horizontal line 302. Thus, the electric power supplied to the electrically driven transmission fluid pump is desirable for providing fluid pressure at threshold 302. Consequently, electrical power consumption is at a desired level. The electrically driven transmission fluid pump control parameters are not being adapted or adjusted at time T14. Electrically driven transmission fluid pump speed is not increased or decreased since its output pressure is at desired level 302. Further, additional adaptation of the electrically driven transmission fluid pump speed is not performed.

In this way, speed of an electrically driven transmission fluid pump may be increased or decreased to provide a desired pressure. Further, the speed may be adjusted for the rotational stopping position of the mechanical transmission fluid pump so that the mechanical pumps leakage that varies with rotational stopping position may be compensated.

Figure 4:
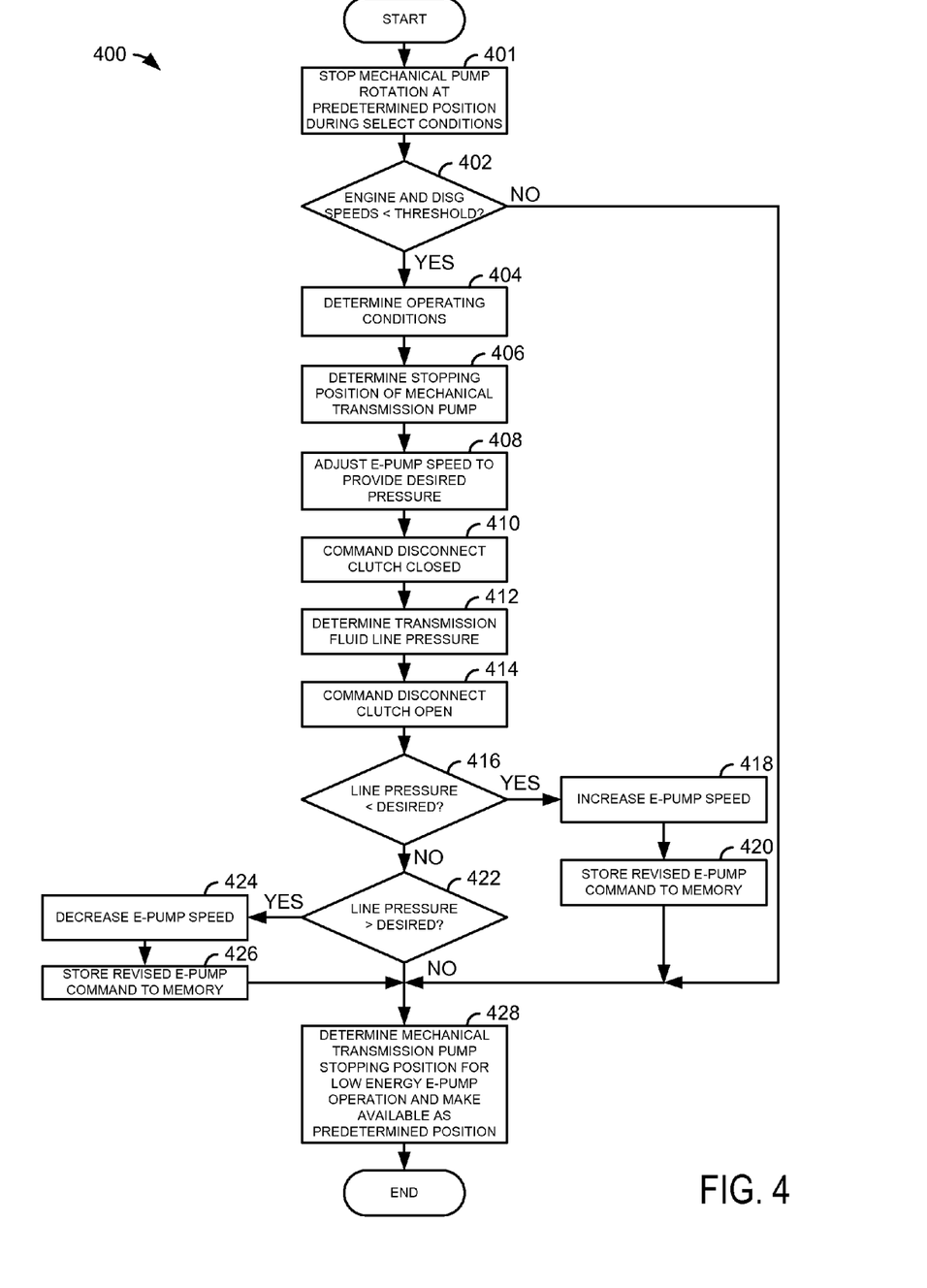
FIG. 4 is a method for operating the hybrid driveline.

Referring now to FIG. 4, a method for operating a driveline is shown. The method may be incorporated into the system of FIGS. 1 and 2 as executable instructions stored in non-transitory memory. Further, the method of FIG. 4 may provide the operating sequences of FIG. 3.

At 401, method 400 judges when to stop rotation of the mechanical transmission fluid pump at predetermined positions during select operating conditions. For example, if the mechanical transmission fluid pump has not stopped rotating at all predetermined positions (e.g., 0 degrees to 359 degrees of mechanical pump rotation in one degree increments, or a smaller group of positions such as 0, 90, 180, and 270), the mechanical transmission fluid pump may stop rotation at any one of the predetermined positions to adapt power supplied to the electrically driven transmission fluid pump or electrically driven transmission fluid pump speed. The mechanical transmission fluid pump may stop rotation when the vehicle is stopped or when driver demand torque is less than a threshold and the vehicle is coasting or traveling downhill. However, if the mechanical transmission fluid pump has stopped rotating at all or a desired number of locations, method 400 may judge to stop the mechanical transmission fluid pump at a position where the least amount of electrical energy is consumed by the electrically driven transmission fluid pump to maintain a desired pressure. For example, if the electrically driven transmission fluid pump consumes 20 watts/hr to supply a desired pressure when the mechanical transmission fluid pump is stopped at 0 degrees, and if the electrically driven transmission fluid pump consumes 22 watts/hr to supply a desired pressure when the mechanical transmission fluid pump is stopped at 100 degrees, method 400 judges to stop mechanical transmission fluid pump rotation at 0 degrees. The mechanical pump is stopped at the desired position by stopping the DISG at the desired mechanical transmission pump position. Method 400 proceeds to 402 after determining the mechanical transmission fluid pump's desired stopping position.

At 402, method 400 judges if the engine and DISG are at a speed less than a threshold speed. For example, method 400 may judge if the DISG is at a speed less than 5 RPM or if the DISG is stopped (e.g., not rotating). If so, the answer is yes and method 400 proceeds to 404. Otherwise, the answer is no and method 400 proceeds to 428.

At 404, method 400 determines driveline operating conditions. Driveline operating conditions may include but are not limited to electrically driven transmission fluid pump speed, electrically driven transmission fluid pump output pressure, mechanically driven transmission fluid pump speed, mechanically driven transmission fluid pump output pressure, vehicle speed, ambient temperature, ambient pressure, and transmission fluid temperature. Method 400 proceeds to 406 after driveline operating conditions are determined.

At 406, method 400 determines a rotational stopping position of the mechanically driven transmission fluid pump. In one example, an encoder or position sensor included at the DISG or at the torque converter impeller outputs the stop position of the mechanically driven transmission fluid pump and supplies the position to a controller. The encoder or position sensor may supply stopping position as an angular measurement (e.g., 0 to 359 degrees of mechanical pump rotation), or the stopping position in angular degrees may be determined via pulses output from the position sensor. Method 400 proceeds to 408 after the mechanically driven transmission fluid pump rotational stopping position is determined.

At 408, method 400 adjusts speed of the electrically driven transmission fluid pump speed to provide a desired pump outlet pressure or transmission line pressure in response to the mechanically driven transmission fluid pump's rotational stopping position (e.g., where the pump's stopping position is in degrees of angular rotation (e.g., 0-359 degrees). In one example, a voltage that corresponds to a desired electrically driven transmission fluid pump speed at the mechanically driven transmission fluid pump rotational stopping position is output to the electrically driven transmission fluid pump. However, a current or voltage duty cycle may similarly be output to the electrically driven transmission fluid pump to provide the desired electrically driven transmission fluid pump speed at the mechanically driven transmission fluid pump rotational stopping position. The desired electrically driven transmission fluid pump speed, duty cycle, voltage and/or current supplied to the electrically driven transmission fluid pump are stored in memory and retrieved based on the mechanically driven transmission fluid pump rotational stopping position. The electrically driven transmission fluid pump is operated by applying the values stored in memory to the electrically driven transmission fluid pump. In one example, a function converts desired electrically driven transmission fluid pump output pressure to desired electrically driven transmission fluid pump speed. Another function converts the desired electrically driven transmission fluid pump speed to a voltage, current, or duty cycle that is supplied to the electrically driven transmission fluid pump. Method 400 proceeds to 410 after supplying the desired current, duty cycle, or voltage to the electrically driven transmission fluid pump.

At 410, method 400 commands the driveline disconnect clutch closed. In one example, the driveline disconnect clutch is commanded closed by opening a variable force solenoid valve. The solenoid valve is commanded to close the driveline disconnect clutch for a period that is shorter than the actual time to close the driveline disconnect clutch. For example, if the driveline disconnect clutch closes in 750 milliseconds, the driveline disconnect clutch may be commanded closed for 300 milliseconds. Method 400 proceeds to 412 after the driveline disconnect clutch is commanded closed.

At 412, method 400 determines transmission fluid line pressure or output pressure of the electrically driven transmission fluid pump. The transmission fluid line pressure is determined via a pressure sensor located at a position between the driveline disconnect clutch and the variable force solenoid. The pressure sensor is located downstream of the electrically driven transmission fluid pump. Method 400 proceeds to 414 after the transmission fluid line pressure is determined.

At 414, method 400 commands the driveline disconnect clutch open. In one example, the driveline disconnect clutch is commanded open by closing a variable force solenoid valve. The solenoid valve is commanded to open the driveline disconnect clutch within a predetermined time the driveline disconnect clutch was commanded closed. For example, the driveline disconnect clutch may be commanded open 300 milliseconds after the driveline disconnect clutch was commanded closed. Method 400 proceeds to 416 after the driveline disconnect clutch is commanded open.

At 416, method 400 judges if the transmission line pressure (e.g., electrically driven transmission fluid pump outlet pressure) is less than a desired threshold pressure. In one example, the desired threshold line pressure is a pressure that holds transmission clutches in their present operating state. In other examples, the desired threshold pressure may be a pressure that actuates transmission components, such as clutches. If method 400 judges transmission line pressure to be less than the desired line pressure, the answer is yes and method 400 proceeds to 418. Otherwise, the answer is no and method 400 proceeds to 422.

At 418, method 400 increases speed of the electrically driven transmission fluid pump. The speed increase may be based on a pressure difference between the threshold transmission line pressure and the line pressure determined at 412. For example, if the difference between the threshold line pressure and the line pressure determined at 412 is 50 kPa, the speed may be increased by 50 RPM. However, if the pressure difference is 100 kPa, the speed increase may be 150 RPM. Method 400 adjusts speed of the electrically driven transmission fluid pump via increasing or decreasing voltage, current, or duty cycle supplied to the electrically driven transmission fluid pump. Method 400 proceeds to 420.

At 420, method 400 stores the adjusted speed, voltage, current, or duty cycle to memory as the adjusted basis for operating the electrically driven transmission fluid pump when the mechanically driven fuel pump is stopped at the same rotational stopping position (e.g., at a same angular degree within a rotation range of 0-359 degrees) during subsequent DISG rotational stop conditions. The adjusted basis is applied to the electrically driven transmission fluid pump at 408 during subsequent rotational stops of the mechanically driven transmission fluid pump. Method 400 proceeds to 428.

At 428, method 400 determines the mechanically driven transmission fluid pump stopping position for low electrically driven transmission fluid pump operation. In one example, a plurality of mechanically driven transmission fluid pump stopping positions and electrically driven transmission fluid pump energy used at the stopping positions to provide the threshold line pressure described at 416 are determined. The stopping position of the mechanically driven transmission fluid pump where energy consumption of the electrically driven transmission fluid pump is lowest is selected. For example, if the electrically driven transmission fluid pump consumes 20 watts/hr to supply a desired pressure when the mechanical transmission fluid pump is stopped at 0 degrees, and if the electrically driven transmission fluid pump consumes 22 watts/hr to supply a desired pressure when the mechanical transmission fluid pump is stopped at 100 degrees, method 400 judges to stop mechanical transmission fluid pump rotation at 0 degrees to reduce energy consumption of the electrically driven transmission fluid pump. The mechanically driven transmission pump is stopped at the position where energy consumption of the electrically driven transmission fluid pump is lowest during subsequent times the mechanically driven transmission pump is stopped as is described at 401. Method 400 may bypass 428 if the mechanically driven fuel pump has stopped only at a few positions. Method 400 proceeds exit after 428.

At 422, method 400 judges if the transmission line pressure (e.g., electrically driven transmission fluid pump outlet pressure) is greater than a desired threshold pressure. In one example, the desired threshold line pressure is a pressure that holds transmission clutches in their present operating state. In other examples, the desired threshold pressure may be a pressure that actuates transmission components, such as clutches. If method 400 judges transmission line pressure to be greater than the desired line pressure, the answer is yes and method 400 proceeds to 424. Otherwise, the answer is no and method 400 proceeds to 428.

At 424, method 400 decreases speed of the electrically driven transmission fluid pump. The speed decrease may be based on a pressure difference between the threshold transmission line pressure and the line pressure determined at 412. For example, if the difference between the threshold line pressure and the line pressure determined at 412 is −50 kPa, the speed may be decreased by 50 RPM. However, if the pressure difference is −100 kPa, the speed decrease may be 150 RPM. Method 400 adjusts speed of the electrically driven transmission fluid pump via increasing or decreasing voltage, current, or duty cycle supplied to the electrically driven transmission fluid pump. Method 400 proceeds to 426.

At 426, method 400 stores the adjusted speed, voltage, current, or duty cycle to memory as the adjusted basis for operating the electrically driven transmission fluid pump when the mechanically driven fuel pump is stopped at the same rotational stopping position during subsequent DISG rotational stop conditions. The adjusted basis is applied to the electrically driven transmission fluid pump at 408 during subsequent rotational stops of the mechanically driven transmission fluid pump. Method 400 proceeds to 428.

It should also be noted that the threshold pressure mentioned at 416 and 422 may be adjusted for operating conditions. For example, the threshold pressure may be increased as ambient temperature decreases. Further, the threshold pressure may be increased as transmission fluid temperature decreases.

In this way, method 400 may adjust electrically driven transmission fluid pump speed to reduce electrical energy consumption while providing a desired transmission line pressure to hold transmission components in their respective operating states. Further, method 400 may seek out stopping positions of the mechanically driven pump that reduce energy consumption by the electrically driven transmission fluid pump.

Thus, the method of FIG. 4 provides for a driveline operating method, comprising: adjusting a speed of an electric transmission pump via a controller in response to a rotational stop position of a mechanically driven transmission pump. The method includes where the rotational stop position is determined via a driveline integrated starter/generator position sensor. The method further comprises adjusting the rotational stop position in response to energy consumption of the electric transmission pump. The method includes where the rotational stop position is adjusted to a position where electric transmission pump energy consumption is determined to be a minimum value for providing a transmission line pressure greater than a threshold via the electric transmission pump. The method includes where the speed is adjusted to provide a desired transmission line pressure. The method includes where the desired transmission line pressure is a pressure sufficient to maintain an operating state of a transmission component. The method includes where the transmission component is a transmission clutch.

The method of FIG. 4 also provides for a driveline operating method, comprising: opening a driveline disconnect clutch; stopping rotation of a driveline integrated starter/generator; adjusting a speed of an electric transmission pump via a controller in response to a rotational stop position of a mechanically driven transmission pump; commanding the driveline disconnect clutch closed; and adjusting the speed of the electric transmission pump in response to a pressure of fluid supplied to the driveline disconnect clutch. The method includes where the driveline disconnect clutch is commanded closed for a time less than a time it takes to close the driveline disconnect clutch.

In some examples, the method includes where the pressure of fluid supplied to the driveline disconnect clutch is sampled between a control valve and the driveline disconnect clutch, and where the control valve is positioned along a conduit at a location between the driveline disconnect clutch and the electric transmission pump. The method further comprises adjusting the rotational stop position in response to energy consumption of the electric transmission pump. The method further comprises commanding the driveline disconnect clutch open after commanding the driveline disconnect clutch closed. The method includes where the driveline disconnect clutch is commanded closed via a solenoid. The method includes where adjusting the speed of the electric transmission pump includes decreasing the speed of the electric transmission pump in response to the pressure of fluid being greater than a threshold pressure. The method further comprises adjusting the threshold pressure in response to transmission operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method performed by an electronic controller, comprising:

determining, with the controller, a rotational stop position of a mechanically driven transmission pump; and adjusting a speed of an electric transmission pump via the controller in response to the rotational stop position of the mechanically driven transmission pump in order to compensate for leakage of the mechanically driven transmission pump that varies with the rotational stop position to provide a desired transmission line pressure.

2. The method of claim 1, where the rotational stop position is determined via a driveline integrated starter/generator position sensor.

3. The method of claim 1, further comprising adjusting the rotational stop position in response to energy consumption of the electric transmission pump.

4. The method of claim 3, where the rotational stop position is adjusted to a position where electric transmission pump energy consumption is determined to be a minimum value for providing the desired transmission line pressure, the desired transmission line pressure greater than a threshold via the electric transmission pump.

5. The method of claim 1, where the desired transmission line pressure is a pressure sufficient to maintain an operating state of a transmission component.

6. The method of claim 5, where the transmission component is a transmission clutch.

7. A driveline operating method performed by a controller, the controller performing:

sending signals to respective actuators to:

open a driveline disconnect clutch to couple an engine to a driveline integrated starter/generator;

stop rotation of the driveline integrated starter/generator to stop a mechanically driven transmission pump at a rotational stop position;

adjust a speed of an electric transmission pump in response to the rotational stop position of the mechanically driven transmission pump in order to compensate for leakage of the mechanically driven transmission pump that varies with the rotational stop position;

command the driveline disconnect clutch closed to equalize a pressure of fluid supplied to the driveline disconnect clutch and electrically driven transmission fluid pump outlet pressure; and adjust the speed of the electric transmission pump in response to the pressure of fluid supplied to the driveline disconnect clutch to reach a desired transmission line pressure.

8. The method of claim 7, where the driveline disconnect clutch is commanded closed for a time less than a time it takes to close the driveline disconnect clutch.

9. The method of claim 7, where the pressure of fluid supplied to the driveline disconnect clutch is sampled between a control valve and the driveline disconnect clutch, and where the control valve is positioned along a conduit at a location between the driveline disconnect clutch and the electric transmission pump.

10. The method of claim 7, further comprising adjusting the rotational stop position in response to energy consumption of the electric transmission pump.

11. The method of claim 7, further comprising commanding the driveline disconnect clutch open after commanding the driveline disconnect clutch closed.

12. The method of claim 7, where the driveline disconnect clutch is commanded closed via a solenoid.

13. The method of claim 7, where adjusting the speed of the electric transmission pump includes decreasing the speed of the electric transmission pump in response to the pressure of fluid being greater than a threshold pressure.

14. The method of claim 13, further comprising adjusting the threshold pressure in response to transmission operating conditions.

15. A system, comprising:
an engine;
a motor;
a disconnect clutch positioned in a driveline between the engine and the motor;
a transmission coupled to the motor, the transmission including an electrically driven pump and a mechanically driven pump; and
a controller including executable instructions stored in non-transitory memory for maintaining a desired transmission line pressure by adjusting a predetermined speed of the electrically driven pump in response to a rotational stop position of the mechanically driven pump, in order to compensate for leakage of the mechanically driven pump, the rotational stop position being a position at which the mechanically driven pump stops rotating.

16. The system of claim 15, where adjusting the predetermined speed includes revising a value stored in memory, and further comprising additional instructions to, during a subsequent driveline rotational stop where the mechanically driven pump stops rotating at the rotational stop position, operate the electrically driven pump at the adjusted predetermined speed.

17. The system of claim 15, further comprising additional instructions to command the disconnect clutch open and determine a pressure output of the electrically driven pump when the disconnect clutch is commanded open.

18. The system of claim 15, further comprising additional instructions to adjust a position of the mechanically driven pump in response to power consumed via the electrically driven pump.

19. The system of claim 15, further comprising additional instructions to adjust the predetermined speed of the electrically driven pump after output pressure of the electrically driven pump is substantially constant.

* * * * *